May 3, 1938.  P. ROBINSON  2,116,449
ELECTROLYTIC DEVICE
Filed June 9, 1936
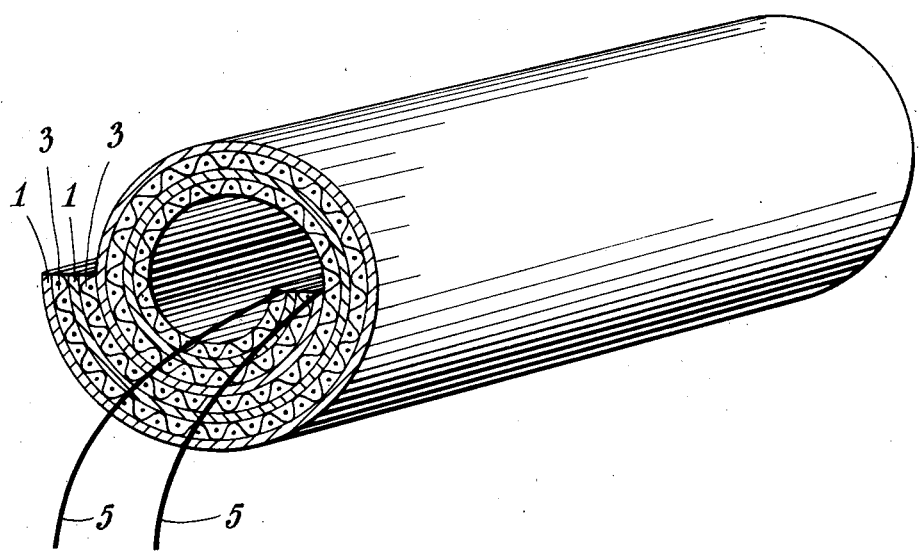
INVENTOR.
PRESTON ROBINSON
BY
Dorsey Cole
ATTORNEYS Patented May 3, 1938

2,116,449

UNITED STATES PATENT OFFICE 2,116,449

ELECTROLYTIC DEVICE

Preston Robinson, Williamstown, Mass., assignor to Sprague Specialties Co., North Adams, Mass., a corporation of Massachusetts Application June 9, 1936, Serial No. 84,341

12 Claims. (Cl. 175—315)

The present invention relates to so-called dry electrolytic condensers.

Dry electrolytic condensers, as is well known, consist as a rule of two electrodes of which at least one is of filming metal, such as aluminum, magnesium, tantalum and the like, and is provided with a film, which is usually electrolytically formed and generally consists of the oxide of the filming metal, in a hydrated or unhydrated form. Of the above filming metals aluminum is most widely used and I shall therefore describe my invention in connection with aluminum electrodes.

The electrodes are usually wound into a roll or assembled into a stack with the interposition of a film-maintaining viscous electrolyte. The viscosity of the electrolyte may vary within a wide range from that of a slightly viscous liquid to that of an almost solid mass.

The electrolyte is usually—although not necessarily—carried by a spacer, which also acts as a separator, and may consist of one or more layers of gauze, paper, cellophane and the like.

According to the circuits in which the dry electrolytic condensers are used, they fall into two groups. Of these the so-called D. C. condensers are used in circuits in which a rectified and predominantly unidirectional current prevails, for example in filter or by-pass circuits of radio apparatus. These condensers have usually only one filmed electrode, which is the anode.

On the other hand, the so-called A. C. condensers are used in circuits where an A. C. current flows or predominates, for example, as starting condensers of capacitor motors. In these condensers as a rule both electrodes are filmed.

My invention applies primarily to A. C. dry electrolytic condensers, although it is also of considerable usefulness for D. C. dry condensers which operate at a much lower voltage than at which their film has been formed.

The A. C. condensers and also D. C. condensers—so far the latter are used at a much lower operating voltage than at which their film has been formed—show a very marked deterioration in operation. This deterioration, the exact reason of which has not been determined, seems to come about because of a gradual reduction of the thickness of the effective film during operation, although the actual physical thickness of the film remains substantially unchanged. The reduction of the effective thickness of the film manifests itself by an increase of the capacity of the condenser, which increase of capacity is also accompanied by an increase of the power factor. Both the increase of capacity and increase of power factor cause the heat developed in the condenser to increase, which in turn further increases the capacity of the film and the power factor. Thus the effect is cumulative and causes deterioration of the condenser with increasing rapidity.

While it is possible to considerably reduce such deterioration of A. C. condensers by negatively biasing the electrolyte, such measure is impractical in most uses of these condensers, as it requires the provision of a separate source of D. C. bias, which is either unfeasible or even if feasible too costly.

I have found that the above deterioration of the film can be prevented or at least greatly reduced by using in the formation of the electrode film certain selected electrolytes, or by using certain selected electrolytes as final electrolyte in the condensers and preferably by combining these two measures.

While a large number of various electrolytes has been suggested for film-formation and also as final or filling electrolyte for dry electrolytic condensers, both the forming and final electrolytes now used are generally of the borate types, i. e., the ionogen is boric acid and/or a salt of boric acid; this because it has been found that such borate electrolytes result in films having for a given thickness higher resistance, higher breakdown voltage, and lower power factor than the films obtained with other electrolytes, and give the condensers better all-round characteristics in operation.

I have found that while the borate electrolytes have indeed the various advantages above enumerated, they are by their nature responsible for bringing about the above referred to deterioration of the film in A. C. use (and in referring to A. C. use I also include here the D. C. use of condensers of which the operating voltage is much below the forming voltage of their film), or at least are unsuccessful in preventing same.

On the other hand I have found that other electrolytes, and particularly electrolytes comprising phosphoric acid and/or salts thereof—and hereafter referred to as phosphate electrolytes—while being in a general way less suited for electrolytic condensers than are borate electrolytes, have inherently the property of preventing the above referred to deterioration of the film or of counteracting the same.

It seems that this advantage of phosphate electrolytes—and this advantage is also shared to some extent by some other electrolytes particularly those containing oxalates and chromates— is due to the fact that these salts, under proper conditions, suppress the solubility of the aluminum in the selected final electrolyte by forming compounds with aluminum oxides or hydroxides which are insoluble in the electrolyte, whereas under these same conditions with borate electrolytes no corresponding insoluble compounds would be formed, and the electrolyte will be found to contain, even after short periods of operation aluminum ions and in general aluminum in excess of .01%.

I am well aware that phosphate electrolytes have been suggested in the past for electrolytic condensers; however, having been generally found much inferior to borate electrolytes for the reasons above stated, and particularly on account of the greater acidity of the phosphoric acid as compared with boric acid, and also because of the difficulties involved in making a suitable pasty electrolyte for dry condensers with phosphates, phosphate electrolytes have not been used in practice.

According to my invention I combine the general advantages of borate electrolytes with the particular advantage of phosphate electrolytes of preventing deterioration of the film in A. C. use.

The condensers made in accordance with my invention have the further advantage of exceedingly good shelf life and are also adapted to operate at much higher temperatures than are the condensers previously available.

This I obtain by using one or both steps of my invention, these steps being briefly the following: (a) the use of a phosphate forming electrolyte; (b) the use of a small addition of phosphate in the final electrolyte. To obtain the best results and full advantage of my invention, I prefer to combine both steps, although each of the above steps produces individually considerable improvement.

It should be understood that suitable substitutes for phosphates are other acid radicals such as chromates and oxalates, which form aluminum compounds which are insoluble in the final electrolyte.

As a forming electrolyte I prefer to use an aqueous solution of a phosphate with a pH usually greater than 6 and preferably above 7, for example, an aqueous solution of .5% disodium phosphate without any further addition, which is somewhat alkaline.

Electrodes formed in such an electrolyte under the conditions later to be stated, will have a film which shows a great resistance to deterioration in A. C. use of the condenser, even if used in a borate electrolyte without further addition.

Instead of using as final electrolyte a borate electrolyte without any addition, I prefer to add to it about .2% to 2% and preferably .2% to .5% of a phosphate. For example, I may use an electrolyte comprising 5%–30% water (this percentage representing the liquid portion of the electrolyte), .5% disodium phosphate, and the remainder glycol and ammonium pentaborate in the proportion of 2 parts of glycol and 3 parts of ammonium pentaborate.

In general, the final electrolytes suitable for such condensers should have a pH value of about 4 to 5, and the addition of the phosphate or other suitable salt (as oxalate or chromate) should be sufficiently small to permit the pH value to remain within the above limits.

As a rule I prefer the addition of very small amounts of such salts, as the beneficial effect obtained by such additions manifests itself usually to substantially the full extent even when the additions amount only to .2% to .5% of the electrolyte. Although greater amounts of these salts as a rule have no deleterious influence as long as the pH remains within the specified range, I have found that in many instances the addition of greater amounts is objectionable because of the difficulty of properly dissolving them in the electrolyte. For example, in case of disodium phosphate with the ionizing solvents and borates usually employed, amounts higher than 2% involve difficulties in dissolving the disodium phosphate.

This and similar final electrolytes give very good results even if the film has been formed in a borate electrolyte; however the results are far superior with a film formed in a phosphate electrolyte of the above type.

My invention will be described in connection with some specific examples and the accompanying drawing, in which:

Figure 1 is a perspective view of an A. C. dry electrolytic condenser embodying the invention.

The condenser shown in Fig. 1 is, for example, a starting condenser for a capacitor motor, and consists of two electrode foils 1—1 of aluminum foil provided with a film made in accordance with the invention.

Prior to film formation the electrodes may be etched by known methods.

The formation of the film on the aluminum foil takes place in an aqueous solution which is preferably a phosphate solution and preferably also a solution which has a pH higher than 6 and usually higher than 7, thus being on the alkaline side. A very suitable solution is, for example, an aqueous solution of .5% disodium phosphate.

However, when forming the aluminum foil in a solution of such a high pH value, even if the solution is slightly on the acidic side, secondary reactions take place which consist mainly in the chemical attack of the aluminum by the phosphate solution.

This chemical attack is the stronger, the higher the pH value of the solution. On the other hand, in the case of phosphate electrolytes the film resistance and breakdown voltage increases with increased pH values of the forming electrolyte, and thus to obtain a high resistant and high breakdown voltage film, in a single formation, the use of a high pH value phosphate electrolyte is required.

I have succeeded in forming in high pH value phosphate electrolytes with a negligible attack of the aluminum by such electrolytes, by using a very high speed of formation. This high speed formation I obtain by forming the aluminum foil in a continuous process in accordance with the processes of my copending patent applications Ser. No. 548,270, filed July 1, 1931, now Patent No. 2,057,314 and Ser. No. 741,493, filed August 25, 1934, now Patent No. 2,057,315 whereby I immediately apply the full forming voltage to the aluminum foil and pass the foil through the forming electrolyte at a rate of about 30 ft. per minute. As some of the electrolyte is carried over mechanically by the foil, I prefer to immediately subject the foil after its passage through the forming electrolyte to washing in distilled water and to subsequent drying. Thereby any reaction of the electrolyte with the aluminum is prevented after the film formation.

For a 110-volt condenser a forming voltage of about 160 volts is used, and preferably the full voltage is immediately applied to the foil.

If the condenser is designed for higher voltages, I prefer to subject the filmed electrode to a second formation in a borate electrolyte, for example in case of a 220-volt starting condenser, I subject the electrode to a formation at 320 volts in a solution of borax and boric acid. In this case, the conditions of the initial phosphate formation may vary over wider limits than those given above.

The electrodes so formed and provided with terminals 5—5 are wound into a roll usually, although not necessarily, with the interposition of spacers 3—3 which may consist of one or more layers of paper, gauze, cellophane and the like. Although the electrolyte may be applied to the spacer before the assembly of the condenser roll, I prefer to impregnate the wound condensers, for example by means of centrifugal impregnation.

The electrolyte used may be a viscous paste comprising as a solvent a polyhydric alcohol and water, and as ionogen a borate and a small amount of phosphate. A suitable electrolyte is one comprising 5% to 30% of water (the water being expressed in percentage of the liquid portion of the electrolyte), .5% disodium phosphate, the remainder being ethylene glycol and ammonium pentaborate in the proportion of two parts of glycol and three parts of ammonium pentaborate. Instead of using .5% disodium phosphate, a smaller or larger percentage of such salt can be used, the range of 0.2-2% having been found suitable; the same range of addition has also been found generally suitable for other phosphates as well as other salts which can be used instead of phosphates, such as oxalates or chromates. In general the exact amount of additions depends on various factors, of which the desired pH value of the electrolyte (which should be usually between 4 and 5) and the resistance of the electrolyte which is preferably somewhat higher than 100 ohms per centimeter cube, (measured at 100° C.) are the most important. The above given limits are therefore to be regarded only as indicative of the order of the amounts of such additions, and not as exact limiting values.

The condensers so obtained will have a very much lower initial power factor than prior art condensers and will maintain their initial properties during their contemplated life.

A series of tests made with three groups of condensers, the condensers of which were identical in every respect except that the forming and final electrolytes for the different groups were different, will illustrate the radical improvement obtained with my invention.

The first group of condensers had films formed in a borate electrolyte and had a borate final electrolyte.

The second group had films formed in a phosphate forming electrolyte, in accordance with the invention, but used a borate final electrolyte.

The third group had films formed in a phosphate forming electrolyte and a phosphate-containing final electrolyte, both in accordance with the invention.

For the same forming voltage and the same electrolyte resistance, the first group showed an average initial power factor of about 4.5%; the second group an average initial power factor of about 3.5%, and the third group an average initial power factor of about 3%.

The condensers were subjected to one of the usual tests prescribed for starting condensers, namely to a continuous life test up to a point where the power factor has increased by 50%.

The first group of condensers after three hours, continuous use had a power factor of about 6.75%, which corresponds to the values usually found with the previously available dry electrolytic starting condensers. The second group of condensers had an average power factor of about 5.25% after 30 hours, whereas the third group of condensers had an average power factor of about 3.75% after 100 hours' use.

Thus it will be noted that the improvement obtained in accordance with my invention is quite startling; and as a 100 hours' continuous test is a more severe test than 500,000 intermittent uses corresponding to 500,000 startings of the motor, a condition to which no condenser would be subjected in actual use; it can be said that condensers made in accordance with the invention will not be subjected in their use to any marked film deterioration.

Besides the above advantages condensers made in accordance with the invention are characterized by exceedingly high stability both with regard to shelf life, as well as with regard to their maintaining their desired characteristics at very high operating temperature.

For example, while prior to the present invention, dry electrolytic starting condensers could not be used at operating temperatures above 55° C., the condensers made in accordance with the invention, operate entirely satisfactorily up to 80° C. and even higher.

This, besides other advantages, makes it possible to place these condensers inside of the housing of the capacitor motor, a construction which has been long aimed at and yet only achieved with the prior art condensers, if auxiliary cooling means were used.

The invention is particularly important in connection with condensers using etched foil electrodes. In such condensers, because of their smaller size for a given capacity compared with condensers using unetched foils, a larger amount of heat is developed in operation per unit of volume of condenser. Because of the stable characteristic of the condenser made in accordance with the invention at higher temperatures, it is possible to use the small sized etched foil condensers in many applications where formerly because of the excessive heat developed in same they could not be used.

A similar improvement of the condensers is also obtained in other A. C. uses, as well as D. C. uses when the forming voltage greatly exceeds the operating voltage.

While I have described my invention in connection with specific examples and in specific applications, I do not wish to be limited thereto, but desire the appended claims to be construed as broadly as permissible in view of the prior art.

In the claims the terms "borate" and "phosphate" are to include the salts of boric and phosphoric acid respectively, the acids themselves, as well as combinations of the respective salts and acid.

What I claim is:

1. In the manufacture of dry electrolytic condensers, the process which comprises, electrolytically forming a film on a filming electrode in a phosphate electrolyte, and assembling said electrode in a condenser having a viscous electrolyte comprising as ionogen a borate and a small addition of phosphate.

2. In the manufacture of dry electrolytic condensers, the process which comprises, electrolytically forming a film on a filming electrode in a phosphate electrolyte having a pH greater than 6, and using said filmed electrode in a condenser having a viscous electrolyte comprising as ionogen a borate and a small addition of phosphate.

3. In the manufacture of dry electrolytic condensers, the process which comprises, electrolytically forming a film on an aluminum electrode in a weak aqueous solution of disodium phosphate and using said electrode in a condenser having a viscous borate-containing electrolyte.

4. In the manufacture of dry electrolytic condensers, the process which comprises, electrolytically forming a film on an aluminum electrode in an alkaline electrolyte comprising as major constituent an aqueous solution of a phosphate, and at a speed of formation sufficiently high to minimize chemical attack of the electrolyte on the aluminum.

5. In the manufacture of A. C. dry condensers for intermittent use, the process which comprises, subjecting filming electrodes to a formation in an aqueous solution of a phosphate electrolyte at a voltage of the order of 160 volts, subsequently subjecting prior to use said electrode to a second formation in a borate electrolyte at a voltage which is in excess of said first forming voltage and of the operating voltage of the condensers and operating said electrodes in condensers having a viscous borate electrolyte comprising a small addition of a phosphate.

6. A dry electrolytic condenser having two electrodes, at least one of which is of filming metal and provided with a film, and a viscous electrolyte interposed between said electrodes, said electrolyte comprising as ionogens a borate and an addition of phosphate, the latter constituting about 0.2% to 2% of the electrolyte.

7. In a dry electrolytic condenser, two electrodes, at least one of which is of filming metal and provided with a film, a viscous electrolyte interposed between said electrode, said electrolyte comprising as ionogen a borate and a compound of the group consisting of phosphates, chromates and oxalates, which compound forms insoluble compounds with aluminum oxide and which constitutes about 0.2% to 2% of the electrolyte.

8. A dry electrolytic condenser having two electrodes at least one of which is of filming metal and provided with a film, and a viscous electrolyte interposed between said electrodes, said electrolyte comprising as ionogen a borate and an addition of phosphate, the latter constituting 0.2% to 0.5% of the electrolyte.

9. A dry electrolytic condenser for alternating current use, comprising two filmed aluminum electrodes, and a viscous electrolyte interposed between same, said viscous electrolyte comprising as ionogens a borate and an addition of phosphate, the latter constituting about 0.2% to 2% of the electrolyte.

10. A dry electrolytic condenser comprising two electrodes, of which at least one is of filming metal and provided with a film, and a viscous electrolyte interposed between same, said electrolyte comprising .2%–1% disodium phosphate, 5% to 30% of water, the remainder being ethylene glycol and ammonium pentaborate.

11. A dry electrolytic condenser comprising two electrodes of which at least one is of film-forming metal and provided with a film, and a viscous electrolyte interposed between said electrodes, said electrolyte comprising as ionogen a borate and a compound of the group consisting of phosphates, chromates and oxalates added thereto in an amount of about 0.2% to 2% of the electrolyte, said condenser having stable characteristics at an operating temperature up to 80° C.

12. In the manufacture of dry electrolytic condensers, the process which comprises, electrolytically forming a film on an aluminum electrode in an electrolyte comprising as major constituent an aqueous solution of a phosphate, and operating said electrode in a condenser having an electrolyte comprising as ionogen a borate and a small addition of a salt of the group consisting of phosphates, chromates and oxalates, which salt forms an insoluble compound with aluminum oxide.

PRESTON ROBINSON.